United States Patent
Schuler et al.

(10) Patent No.: US 7,041,406 B2
(45) Date of Patent: May 9, 2006

(54) FUEL CELL BATTERY WITH AN INTEGRATED HEAT EXCHANGER

(75) Inventors: Alexander Schuler, Weisslingen (CH); John Schild, Winterthur (CH); Markus Jenne, Winterthur (CH); Philip Holoch, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 427 days.

(21) Appl. No.: 10/370,044

(22) Filed: Feb. 18, 2003

(65) Prior Publication Data

US 2004/0043267 A1    Mar. 4, 2004

(30) Foreign Application Priority Data

Mar. 19, 2002  (EP) ................... 02405212

(51) Int. Cl.
  H01M 8/04   (2006.01)
  H01M 8/06   (2006.01)

(52) U.S. Cl. .............. 429/26; 429/30; 429/34; 429/120; 165/177

(58) Field of Classification Search .......... 429/26, 429/30, 12, 34, 120; 165/177
See application file for complete search history.

(56) References Cited

U.S. PATENT DOCUMENTS

| 4,910,100 | A | 3/1990 | Nakanishi et al. |
| 5,330,858 | A | 7/1994 | Shundou et al. |
| 5,338,622 | A * | 8/1994 | Hsu et al. ............ 429/26 |
| 6,258,474 | B1 * | 7/2001 | Diethelm et al. .......... 429/26 |
| 2001/0009732 | A1 * | 7/2001 | Schuler ................ 429/19 |
| 2003/0054215 | A1 * | 3/2003 | Doshi et al. ............ 429/26 |
| 2004/0224196 | A1 * | 11/2004 | Pastula et al. ............ 429/20 |

FOREIGN PATENT DOCUMENTS

| EP | 0580918 A1 | 2/1994 |
| JP | 6228350 A | 12/1987 |

* cited by examiner

Primary Examiner—Tracy Dove
(74) Attorney, Agent, or Firm—Townsend and Townsend and Crew LLP

(57) ABSTRACT

The fuel cell battery (1) has an integrated heat exchanger (4) which is arranged between a heat insulating jacket (12) and a stack (10) of high temperature fuel cells (2). There is a chamber (3), preferably at least two chambers for afterburning, between a periphery (14) of the cell stack and the heat exchanger. The heat exchanger is provided for a heat transfer from an exhaust gas (7) to a gaseous oxygen carrier (5). There are arranged on the stack periphery (14), outside or inside the chamber or chambers respectively, inlet points (25a) for the oxygen carrier, on the one hand, and outlet points (25b, 26b) for non-converted educts, namely a fuel gas (6) and the oxygen carrier, on the other hand. The heat exchanger (4) includes a passage system (4) through which the exhaust gas (7) and the oxygen carrier (5) flow largely in transverse planes disposed perpendicular to the axis of the cell stack (10) in one operating state of the battery. The exhaust gas can be led off through axially directed collecting passages (47") which are arranged in a peripheral region of the heat exchange. Parts of the heat exchanger, which are disposed between the peripheral region and the cell stack, form a shield for screening the cell stack from the collecting passages with respect to a thermal influence.

15 Claims, 4 Drawing Sheets

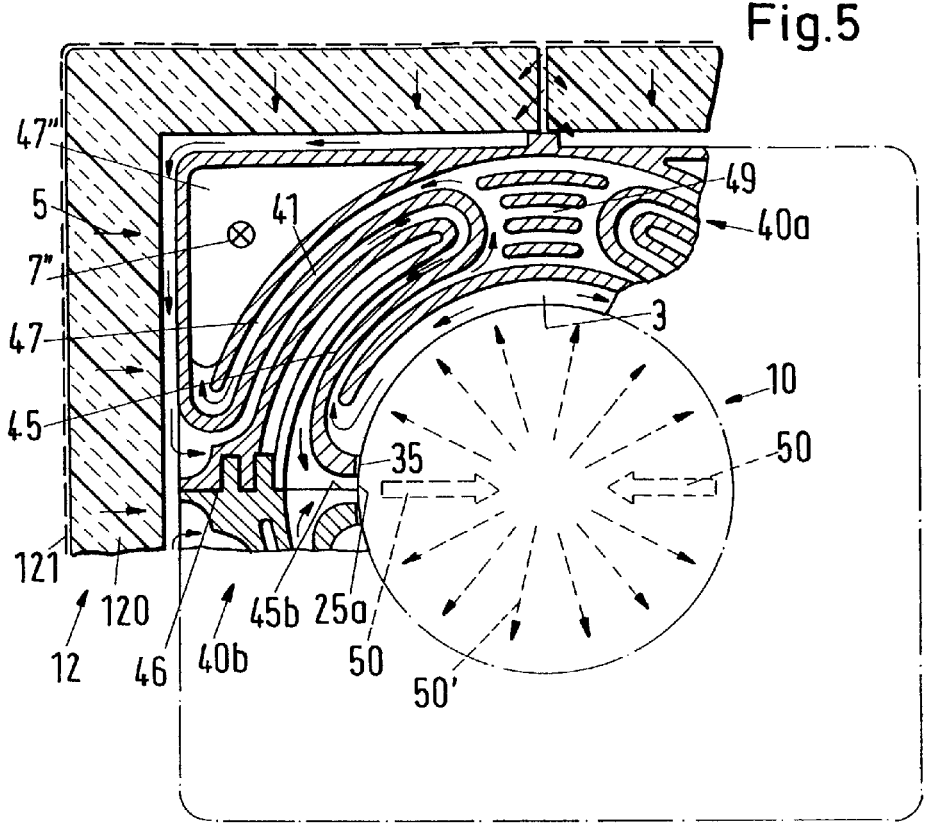
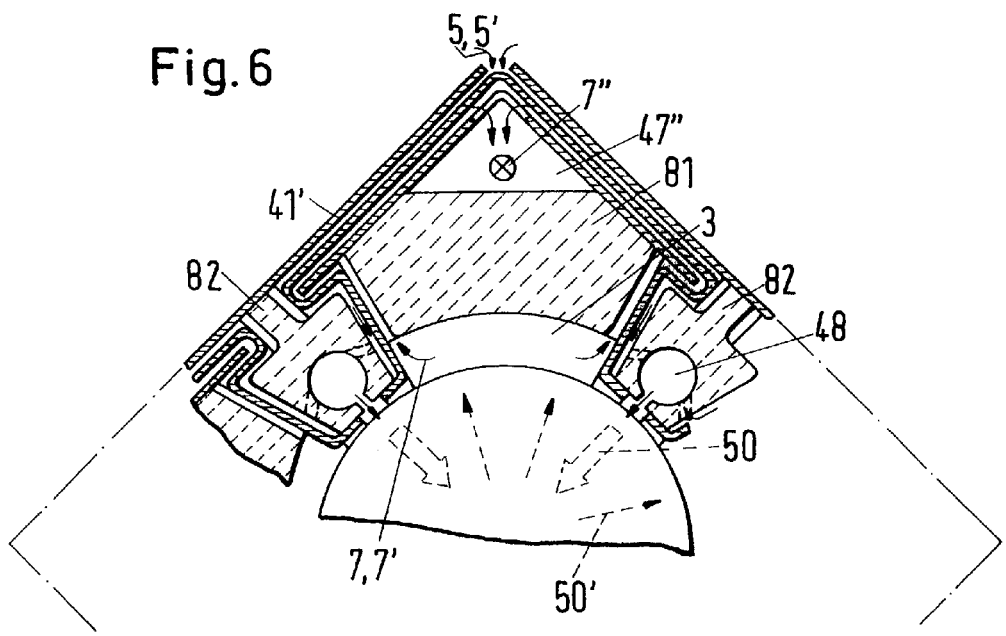

FUEL CELL BATTERY WITH AN INTEGRATED HEAT EXCHANGER

BACKGROUND OF THE INVENTION

The invention relates to a fuel cell battery with an integrated heat exchanger. It also relates to a plant with the fuel cell battery in accordance with the invention.

A fuel cell battery having a cylindrical cell stack is known from EP-A 1 037 296 in which afterburning is carried out at the periphery of the stack. The afterburning is carried out using educts which have not been converted in the current supplying electrochemical reactions in the cells. The educts are a gaseous fuel (in brief, fuel gas), on the one hand, i.e. a mixture which includes reducing components, in particular hydrogen and carbon monoxide, and a gas with oxidizing modules, on the other hand, in particular a gaseous oxygen carrier, for example in the form of heated environmental air. Each cell of the stack has at least one inlet point for the oxygen carrier. The afterburning is provided within a ring-shaped region around the cell stack. The inlet points are either all connected in a communicating manner as an entity, or are connected in a communicating manner group-wise, via at least one air space which extends axially along the cell stack and which is in direct contact with this. Each air space is separated by a wall from a chamber for the afterburning which likewise forms a space communicating axially along the cell stack. Each fuel cell includes two parts, namely a so-called PEN element (called PEN in brief and a disc-shaped inter-connector. The PEN element, which consists of at least three layers, namely P (cathode=positive electrode), E (electrolyte) and N (anode), is an electrochemically active element with which the electrochemical reactions can be carried out; it has the form of a thin, circular disc which consists, for example, of a layer-shaped solid electrolyte and two electrodes, P and N respectively, applied by coating. The inter-connector separates a space for the oxygen carrier from a space for the fuel gas. It has an architecture with a relief-like profile by means of which a flow of the fuel gas from a central inlet point is made possible along the PEN to the periphery. On the other hand, a transport of the oxygen carrier is guided by the special architecture and leads from the air chamber or from the air chambers to the center and from there along the PEN back to the periphery. Discretely arranged openings for the inlet or the outlet of the gases are disposed at the periphery.

A jacket, which envelopes the cell stack in the known fuel cell battery, is made as a heat insulation system. Its heat insulating function plays the role of an external recuperator. Instead of the oxygen carrier required in the cells for the electrochemical processes first being pre-heated in a separate external recuperator, the initially cold oxygen carrier is used as a heat sink in that the heat flowing away from the cell stack is partly absorbed in the jacket by the oxygen carrier and is returned to the reaction point or zone.

The known jacket is made with multiple layers; it has a passage system for the flow of the oxygen carrier. A first hollow space, in which a distribution and a heating of the oxygen carrier or a cooling of the jacket takes place, is disposed between an outer wall, which forms a first layer of the jacket, and the inner parts of the jacket. A further heating of the oxygen carrier results in the passage system which adjoins the first hollow space. Instead of, or in addition to, the passages, porous, gas permeable parts can also be installed in the jacket which form a so-called dynamic heat insulation: the oxygen carrier, which flows through the pores of the heat insulation in the radial direction, absorbs heat which is mainly emitted from the cell stack by heat radiation, and is absorbed by the material of the heat insulation. The absorbed heat is transported back into the cell stack by the oxygen carrier.

The afterburning chambers are made as axially directed collecting passages through which the exhaust gas can be led away, in particular sucked off. When moving from the jacket into the cell stack, the oxygen carrier is heated up further at the outer walls of the afterburning chambers; heat is accordingly given off by the exhaust gas flowing axially in the chambers, the heat corresponding to the heat arising during the afterburning and to a part of the heat released by the electrochemical reactions.

As a rule, the largest possible electrical power should be achieved with a system in which fuel cells are used for an energy conversion. In this connection, the electrochemical reactions are carried out in a steady state of the fuel cell system and under conditions for which an optimal utilization of the system results with respect to the efficiency of the reactions and a temperature-dependent ageing of the PEN elements.

In one design of the fuel cell system, the calculation of an energy balance has to be carried out with the following amounts of heat being involved in the calculation for a steady state: the amounts of heat produced in the reactions and during the afterburning; the heat loss, i.e. the amount of heat which flows away through the jacket to the environment; and the excess amount of heat which is led away out of the system with the exhaust gas. Various parameters play a role in this connection, including: the temperatures in the cells, the temperatures in the chambers for the afterburning, the air ratio $\lambda$, or another corresponding parameter. ($\lambda$ is the ratio between the mass flows of the air supplied and the stoichiometrically required amount of air, with air being the oxygen carrier.) The fuel cell system can be designed such that the reaction temperature is ideal and is largely equally high in each cell. This design is carried out with respect to a full load, i.e. with respect to the maximum electrical power which can be achieved under optimum conditions.

The fuel cell system can be used in a plant which is part of a building infrastructure, with the energy converted by the fuel cells being used in the form of thermal energy (for example for heating purposes) and of electrical energy. Since the energy supply of a building must follow variable requirements, it is also necessary for the fuel cell system to be able to be operated at part load. At part load, the supply flows for the educts are reduced; the reaction temperature must, however, still be maintained—at a value, for example, of 900° C. Since the heat loss at part load is higher than at full load (because the dynamic heat insulation performance of the jacket becomes smaller due to a reduced air supply), there is no linear relationship between the amount of energy converted and the mass flows of the educts. The operation of the fuel cell system can be regulated in line with requirements and according to the non-linearities with a suitably designed control system.

There is a further problem in this connection, and indeed with respect to the design of the system, in which there is the aim of not allowing any axial temperature gradients to arise in the cell stack. It has been found that, at part load, a temperature gradient cannot be prevented along the cell stack if this temperature gradient is zero at full load due to the design: the exhaust gas flowing away axially in the afterburning chambers is subjected to a reduction in its temperature due to the heat transfer to the jacket; because the heat reserve from the cell stack cannot fully compensate the heat transfer to the jacket at part load. This results in the temperature gradients of the cell stack, and indeed with a decreasing temperature in the flow direction of the exhaust gas. It is therefore no longer possible to carry out the electrochemical reactions in all fuel cells at the optimum temperature of full load operation.

SUMMARY OF THE INVENTION

It is an object of the invention to provide a fuel cell battery which can be operated at full load as well as at part load such that the electrochemical reactions can take place in all cells at largely the same temperature.

The fuel cell battery includes an integrated heat exchanger which is arranged between a heat insulating jacket and a cylindrical stack of high temperature fuel cells. There is a chamber, preferably at least two chambers for an afterburning, between a periphery of the cell stack and the heat exchanger. The heat exchanger is provided for a heat transfer from an exhaust gas to a gaseous oxygen carrier. There are arranged on the stack periphery, outside or inside the chamber or chambers respectively, inlet points for the oxygen carrier, on the one hand, and outlet points for non-converted educts, namely a fuel gas and the oxygen carrier, on the other hand. The heat exchanger includes a passage system through which, in one operating state of the battery, the exhaust gas and the oxygen carrier flow largely in transverse planes perpendicular to the axis of the cell stack. The exhaust gas can be led off through axially directed collecting passages which are arranged in a peripheral region of the heat exchanger. Parts of the heat exchanger, which are disposed between the peripheral region and the cell stack, form a shield for screening the cell stack from the collecting passages with respect to a thermal influence.

The invention will be described in the following with reference to the drawing.

BRIEF DESCRIPTION OF THE DRAWINGS

FIGS. 5, 6 show a second and third embodiment respectively of the heat exchanger in accordance with the invention.

DESCRIPTION OF THE PREFERRED EMBODIMENTS

Figures 1, 2:
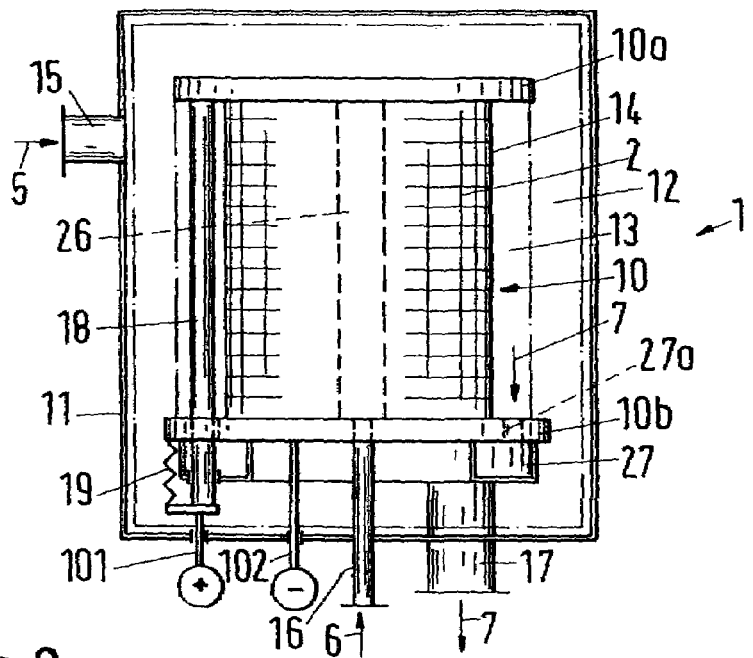
FIG. 1 shows a known fuel cell battery.
FIG. 2 is a representation of the architecture of fuel cells.

The battery 1 comprising fuel cells 2 represented in FIG. 1 and known from EP-A 1 037 296 includes the following modules: a cell stack 10 between a jacket plate 10a and a base plate 10b, which are made as electrical poles of the battery 1; a ring-shaped space 13 at the periphery 14 of the cell stack 10 within which afterburning is planned; a heat insulating jacket 12 (drawn only in outline in chain-dotted lines); an outer wall 11 of the battery 1 with a stub 15 for the supply of air or of a gaseous oxygen carrier 5; an inlet point 16 for a fuel 6 in fluid form which is distributed in gaseous form to the individual cells along a central passage 26—optionally after gasification and/or reforming; a ring-shaped collecting passage 27 for an exhaust gas 7 which can be drawn off from the battery 1 via a stub 17; furthermore, rods 18 (only one visible) and springs 19, with which the two plates 10a and 10b can be drawn towards one another. Chambers 3 (see FIG. 2) for afterburning, which are arranged in the annular space 13, but which are not shown in FIG. 1, are in communication with the collecting passage 27 via openings 27a in the base plate 10b. The electrical current produced in the battery can be drawn off via connectors 101 and 102, with the rod 18 also being used, in addition to its function as a clamping means, as an electrical connection to the jacket plate 10a.

The inter-connectors of the fuel cell known from EP-A 1 037 296 is made in two layers. With this architecture, the incoming air is further heated in a hollow space between the two layers before it is brought into contact—heated to a temperature which is close to the reaction temperature—in a central region of the cell with a cathode (P). The cells 2 of the stack 10 shown in FIG. 2 include inter-connectors 21 which are made in one layer. The oxygen carrier 5 fed into the cell 2 (arrow 50) is led from an inlet point 25a via a radial passage 25 into a central region of the cell 2. From there, the oxygen carrier 50' flows radially over the cathode to the periphery 14 again, where it flows through slit-shaped openings out of outlet points 25b into an afterburning chamber 3. This chamber 3 has a chamber wall 30' which is indicated by chain-dotted lines. Such a wall 30' is already known. The bounding of the chamber 3 provided by the wall 30' appears in new forms in integrated heat exchangers 4 which are made in accordance with the invention—see FIGS. 4 to 6.

The inter-connectors 21 have knob-like elevations 22 (reference numeral 22' for indicated elevations) which produce electrical connections to adjoining PEN elements 20. The side walls of the radial passages also represent electrical connections. An axial passage 26 is disposed at the center of the stack 10 and the gaseous fuel 6 (arrow 60) is fed into the individual cells 2 through this. An annular elevation 23 in the central region prevents the oxygen carrier 5 entering into the axial passage 26. The fuel 6 reaches an anode (N) of the PEN element 20 in each case through slits 26a between the rings 23 of neighboring inter-connectors 21. The fuel 6 (arrows 60') flows on the anode to the periphery 14 of the stack where it flows out of outlet points 26b through slit-like openings into the afterburning chambers 3 and where the exhaust gas 7 arises due to the afterburning. The exhaust gas 7 flows away in the axial direction (arrow 7") in a passage formed by the wall 30'.

Figure 3:
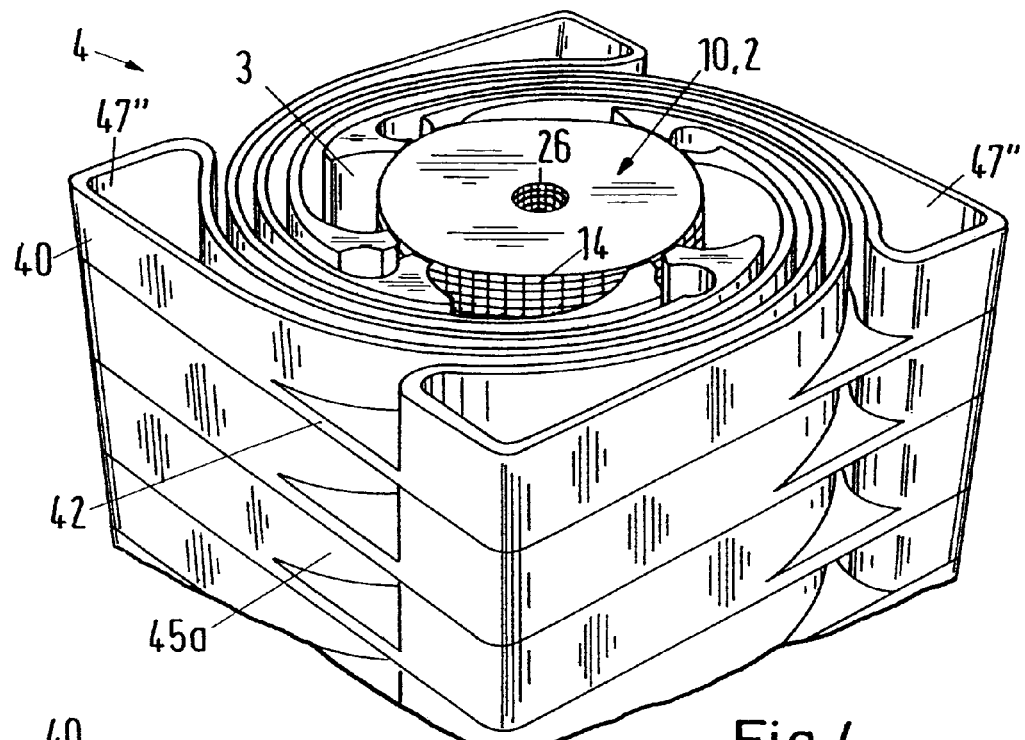
FIG. 3 shows an integrated heat exchanger in accordance with the invention.
Figure 4:
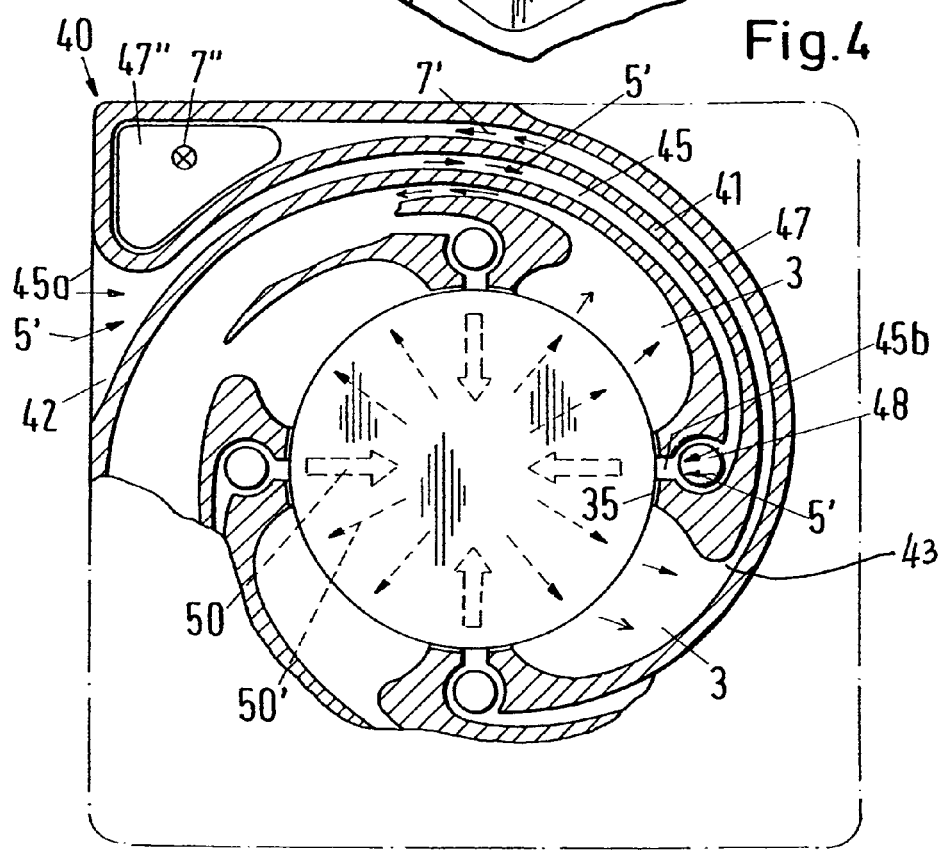
FIG. 4 is a cross-section through the heat exchanger of FIG. 3.

An integrated heat exchanger 4 in accordance with the invention, which is made in tubular form, is shown in FIGS. 3 and 4. The cell stack 10 is arranged in the interior space of this tube. Chambers 3 for the afterburning are formed by cut-outs on the inner side of the integrated heat exchanger. The chambers 3 have slit-like outlet openings 43 which allow an outflow of the exhaust gas into a passage system that extends over the total height of the cell stack 10. In corresponding manner, the oxygen carrier 5 can likewise enter over the whole height of the cell stack 10 into the cells through slit-like outlet openings 45b. The exhaust gas 7 and the oxygen carrier 5 in the passage system of the heat exchanger 4 therefore flow largely in transverse planes which lie perpendicular to the axis of the cell stack 10.

The pre-heated oxygen carrier 50 in the cells 2 of the stack 10 is led through four passages 25 (see FIG. 2) into the central region where each of the four-part flows branches off so that the oxygen carrier 5 flows back from each part flow to two respective adjacent chambers 3. (This is indicated by differently drawn arrows.)

The exhaust gas 7 can be led off through axially directed collecting passages 47". These are arranged in a peripheral region of the heat exchanger 4. Conditions which are substantially the same for all cells 2 result due to the guiding of the exhaust gas flow 7' and of the flow 5' of the oxygen carrier 5 in transverse planes. In order for the flows 5' and 7' to move in the direction of the transverse planes, the collecting passages 47" must have relatively large cross-sectional areas so that the pressure gradients along the collecting passages 47" are much smaller than the pressure gradients of the gases flowing in narrow channels 45, 47 of the passage system.

Due to the guiding of the flows 5' and 7' in transverse planes, a relatively small temperature gradient results in the axial direction in the cell stack 10. It is also important in this connection that parts of the heat exchanger 4, which are disposed between the peripheral region of the heat exchanger 4 and the cell stack 10, form a shield for screening the cell stack 10 from the collecting passages 47" with respect to a thermal influence. Since the exhaust gas 7 in each case loses some heat to its environment in the collecting passage 47", an axial temperature gradient arises in the exhaust gas flow 7". However, due to the screening, this temperature gradient is largely without influence on the temperature distribution in the cell stack 10.

The passage system of the integrated heat exchanger 4 includes longitudinal walls 41 which stand perpendicular to the transverse planes and thus form the channels 45, 47: the channels 47 for the exhaust gas 7 connect the chambers 3 for the afterburning to the collecting passages 47"; the channels 45 for the oxygen carrier 5 connect peripheral inlet points 45a to the inlet points 25a of the cell stack 10. The cross-sections of the channels 45, 47, through which flow takes place, are substantially smaller than those of the axially aligned collecting passages 47". Flow speeds therefore result which are much higher in the channels 45, 47 than in the collecting passages. The heat transfer to the walls is therefore smaller in the collecting passages 47" than in the channels 45, 47. This is advantageous since a small heat loss in the collecting passages 47" results in a small temperature gradient there.

The walls 41 of the channels 45, 47 are largely transverse to the radial plane lying on the stack axis. This architecture is advantageous since it prevents a heat transport on the basis of heat radiation.

The channels 45, 47 are arranged such that the flows 5' of the oxygen carrier 5 and the flows 7' of the exhaust gas 7 are guided in counterflow at least in a predominant part of the heat exchanger 4.

Seals 35 are inserted between the outlet openings 45b for the heated oxygen carrier 5 and the afterburning chambers 3 so that the smallest possible leakage of the oxygen carrier into the exhaust gas 7 occurs. Strips of ceramic felt, which have been compacted by pressing, can be used as the seals 35.

The integrated heat exchanger 4 is composed of a plurality of modules. Each module includes a transverse base plate 42 and longitudinal walls 41. The modules are preferably all made the same. An endpiece, for example, which comes to rest at an end of the cell stack, can be present in a modified form. The modules each have a monolithic form. They can be made of ceramic material or of clay ceramic material (by sintering of ceramic powder pressed into a mold; or by a clay mass which is dried and fired after a plastic molding). The modules form a plurality of "levels" in the heat exchanger 4.

The collecting passages 47" for the exhaust gas 7 are arranged in four corner regions of a largely square cross-section of the integrated heat exchanger 4. The square geometry makes it possible to establish a relatively large distance between the collecting passages 47" and the cell stack 10 in a space-saving manner.

With the integrated heat exchanger 4 of the fuel cell battery 1 in accordance with the invention, the oxygen carrier 5 can be heated to substantially higher temperatures (to approximately 800° C.) than with the known battery (approximately 700° C.). A higher air ratio λ is therefore possible, which is advantageous for the electrical yield of the electrochemical reactions. Whereas in the known battery the air ratio λ amounts to approximately 1.5 to 2, a doubling or tripling of this value is possible with the heat exchanger 4.

Hollow spaces 48 with circular cross-sections are arranged at the outlet openings 45b for the heated oxygen carrier 5. These are provided for electrical heating bars which are inserted into the hollow spaces 48 (with an annular gap remaining open) and with which the heat exchanger 4 and the supplied oxygen carrier 5 can be heated when the battery 1 is started up. With the heated oxygen carrier 5, the stack is heated and brought into a state ready for operation when flow takes place through the cell stack 10.

A temperature reduction from approximately 900° C. to 500° C. is attained over a distance of a few centimeters with the integrated heat exchanger 4 of the fuel cell battery in accordance with the invention. The hot region is thus limited to a volume which is advantageously smaller than with known fuel cell batteries. The special geometry of the heat exchanger 4 also makes it possible to match the height of the cell stack to a predetermined power requirement without design problems. The heat exchanger area can also be easily matched with respect to a predetermined air ratio λ.

FIG. 5 shows a second embodiment of the integrated heat exchanger 4 which can be composed of monolithic modules. Here, the "levels" are made in each case of two modules 40a, 40b. This heat exchanger 4 is provided for fuel cells 2 which only have two inlet points 25a for the oxygen carrier 5 fed in. Corresponding outlet points 45b for the pre-heated oxygen carrier 5 are arranged at two joint positions 46 (only one shown) between the modules 40a, 40b. The joint position 46, which has a toothed arrangement, can be provided with a seal. However, a small gap can also remain open through which a small portion of the oxygen carrier 5 passes as a secondary flow to the outlet opening 45b. This secondary flow is pre-heated by the hot wall material of the heat exchanger 4 such that the heat exchanger power performance is not impaired by the gap if it is sufficiently small.

The jacket 12, or a part of the jacket 12, consists of a dynamically heat insulating shell 120 which is composed of two shell halves, and of an air permeable element 121 with which the parts of the shell 120 are held together. A gap 122 can be left open between the two halves of the shell 120 to allow more oxygen carrier 5 to flow in locally. The periphery of the heat exchanger 4 can thus be cooled more locally, and indeed as in the example shown, when an increased outflow of heat takes place from the cell stack 10 to the periphery in a region 49 of the passage system in which no heat exchange takes place.

FIG. 6 shows a third embodiment of the integrated heat exchanger 4 which is produced from a combination of parts of ceramic and metal materials. It consists of ceramic displacement bodies or fillers 81, 82 and metal walls 41' through which the heat exchange takes place between the exhaust gas flow 7' and the flow 5' of the oxygen carrier 5. The disadvantages of this embodiment are that the metal materials are substantially more expensive and have a larger thermal coefficient of expansion than ceramic materials. Different coefficients of expansion must be suitably taken into account in the design of the battery 1. In particular, grooves must be provided in the jacket plate 10*a* (see FIG. 1) into which the walls 41' can expand in an axial direction on heating.

Figure 7:
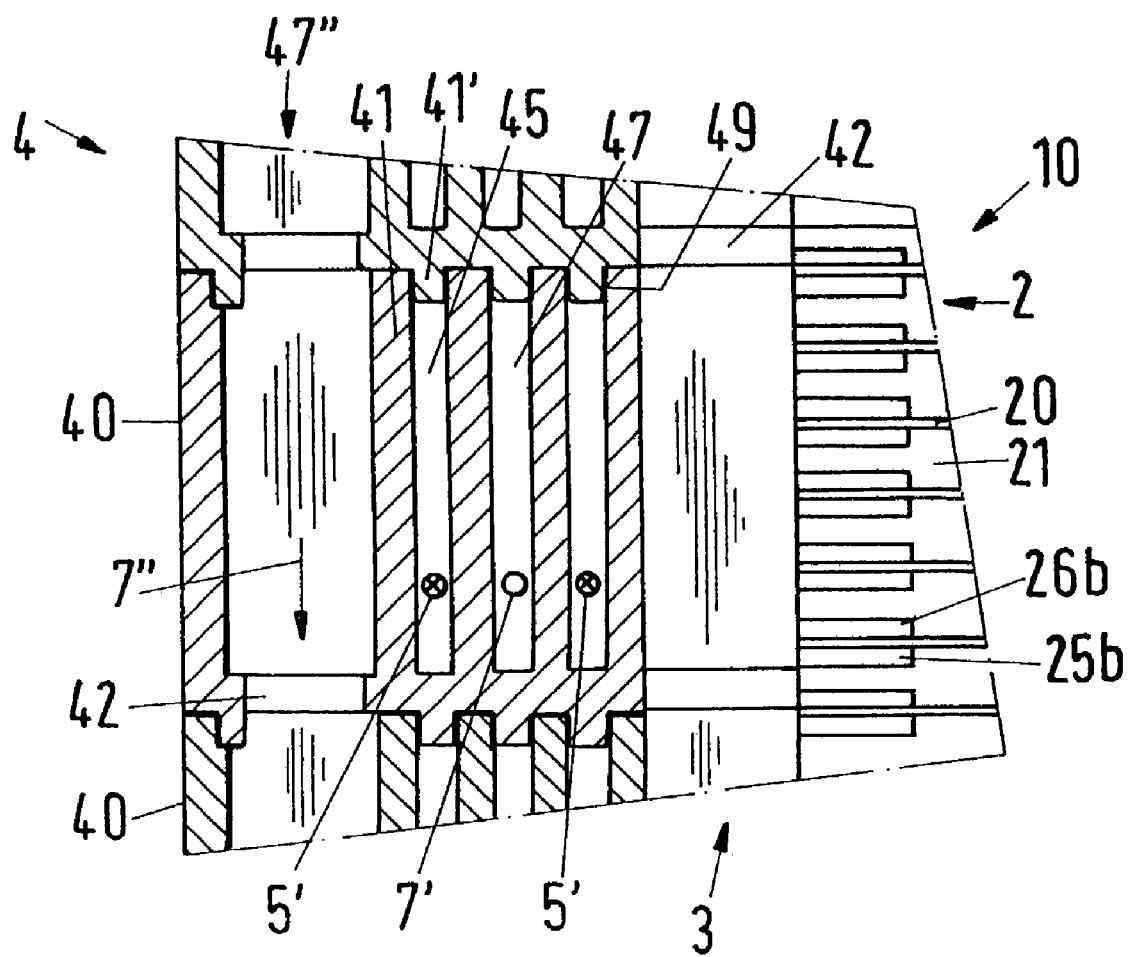
FIG. 7 is a longitudinal section through the heat exchanger of FIG. 3.

FIG. 7 sectionally shows a diagonal longitudinal section through a "level" of the heat exchanger 4 of FIG. 3 which forms a jacket around the cell stack 10. Ribs 41' are molded at the lower side of the transverse base plate 42 of a module 40 and can be inserted between the walls 41 of the adjacent module 40. A seal 49 between adjacent passages, in particular channels 45, 47 at the joint positions, can be manufactured with a solder glass. In the operation of the fuel cell battery 1, cracks can result in the seal 49. A possible leak through these cracks is without any large influence on the efficiency of the battery 1 due to the toothed arrangement between the ribs 41' and the walls 41.

The fuel cell battery in accordance with the invention is provided for use in a building infrastructure. A plant for this purpose includes additional control means with which the operation of the fuel cell battery is controlled with respect to a variable requirement for electrical energy and heating power. The volume flow of the oxygen carrier, which is conveyed through the battery, is appropriately matched to the variable energy requirements by means of the control means. In this connection, the temperatures in the cell stack can be regulated in a controlled manner to values within a small temperature range. The extent of the temperature range is less than 50 K, preferably less than 20 K.

The invention claimed is:

1. A fuel cell battery comprising an integrated heat exchanger which is arranged between a heat insulating jacket and a stack of high temperature fuel cells, the cell stack having a central axis, a chamber for afterburning between a periphery of the cell stack and the heat exchanger, the heat exchanger being provided for a heat transfer from an exhaust gas to a gaseous oxygen carrier, inlet points for the oxygen carrier and outlet points for non-converted educts being arranged on the stack periphery, the heat exchanger including a passage system through which the exhaust gas and the oxygen carrier flow in planes disposed perpendicular to the axis of the cell stack in one operating state of the fuel cell battery, axially directed collecting passages for the exhaust gas being arranged in a peripheral region of the heat exchanger, and parts of the heat exchanger disposed between the peripheral region and the cell stack forming a shield screening the cell stack from the collecting passages with respect to a thermal influence.

2. A fuel cell battery in accordance with claim 1 wherein the cell stack is composed of alternately arranged modules comprising electrochemically active plates and inter-connectors, each module having a central opening for the feeding of the fuel gas into the individual cells, and wherein the jacket forms a dynamic heat insulating system in which heat can be absorbed by the supplied oxygen carrier.

3. A fuel cell battery in accordance with claim 1 wherein the passage system of the integrated heat exchanger includes walls forming channels, the channels for the exhaust gas connecting the chambers for the afterburning to the collecting passages and channels for the oxygen carrier connecting peripheral inlet points to the infeed points of the cell stack, and the cross-sections of the channels, through which flow takes place, are substantially smaller than those of the axially aligned collecting passages.

4. A fuel cell battery in accordance with claim 3 wherein the walls of the channels are oriented transversely to radial planes disposed on the stack axis.

5. A fuel cell battery in accordance with claim 3 wherein the channels are arranged such that, in one operating state of the fuel cell battery, the flows of the oxygen carrier and of the exhaust gas flow at least predominantly as counterflows.

6. A fuel cell battery in accordance with claim 1 wherein the chambers for the afterburning are formed in cut-outs in the integrated heat exchanger.

7. A fuel cell battery in accordance with claim 1 wherein the integrated heat exchanger is composed of a plurality of modules.

8. A fuel cell battery in accordance with claim 1 wherein the integrated heat exchanger has a substantially square cross-section and the collecting passages for the exhaust gas are arranged in four corner regions of the integrated heat exchanger.

9. A fuel cell battery in accordance with claim 1 wherein the integrated heat exchanger comprises at least one of ceramic, clay ceramic and metal materials and is assembled from a plurality of parts, which are made as at least one of heat transferring walls and shape-giving displacement bodies.

10. A plant comprising a fuel cell battery in accordance with claim 1 and having control means, wherein the plant is part of a building infrastructure and the control means is provided to control the operation of the fuel cell battery with respect to a variable requirement for electrical energy and heating power, wherein a volume flow of the oxygen carrier conveyed through the fuel cell battery can be matched according to the variable energy requirements by the control means, and wherein the temperatures in the cell stack are regulated in a controlled manner to be within a narrow temperature range which is smaller than 50 K.

11. A fuel cell battery according to claim 1 wherein the inlet points and the outlet points are arranged on one of the outside and the inside of the chamber.

12. A fuel cell battery according to claim 7 wherein at least a large part of the modules are made the same.

13. A fuel cell battery according to claim 12 wherein all modules are made the same.

14. A fuel cell battery according to claim 7 wherein each module forms a monolithic structure.

15. A plant according to claim 10 wherein the narrow temperature range is smaller than 20 K.

* * * * *